United States Patent [19]

Kuzunishi

[11] Patent Number: 4,541,303
[45] Date of Patent: Sep. 17, 1985

[54] FLEXIBLE COAXIAL PUSHPULL CABLE

[75] Inventor: Hiroyuki Kuzunishi, Nagoya, Japan

[73] Assignee: Chuo Hatsujo Kabushiki Kaisha, Nagoya, Japan

[21] Appl. No.: 644,658

[22] Filed: Aug. 27, 1984

Related U.S. Application Data

[63] Continuation of Ser. No. 357,524, Mar. 12, 1982, abandoned.

[30] Foreign Application Priority Data

Mar. 12, 1981 [JP] Japan ................................. 56-34564

[51] Int. Cl.$^4$ ............................................... F16C 1/10
[52] U.S. Cl. .............................. 74/501 R; 74/501 P
[58] Field of Search .......................... 74/501 R, 501 P

[56] References Cited

U.S. PATENT DOCUMENTS

| | | | |
|---|---|---|---|
| 2,211,790 | 8/1940 | Pile ................................. | 74/501 R |
| 2,382,966 | 8/1945 | Arens . | |
| 3,435,634 | 4/1969 | Chatham ......................... | 74/501 R |
| 3,584,518 | 6/1971 | Hurlow ............................ | 74/501 R |
| 4,238,974 | 12/1980 | Fawcett ......................... | 74/501 P X |

FOREIGN PATENT DOCUMENTS 647858  9/1962  Canada ............................. 74/501 R

*Primary Examiner*—James A. Leppink
*Assistant Examiner*—Frank H. McKenzie, Jr.
*Attorney, Agent, or Firm*—Jordan and Hamburg

[57] ABSTRACT

A flexible coaxial pushpull cable comprising an outer cable member, and an inner cable member disposed inside the outer member so as to be slidable lengthwise therein, the inner cable member having a projecting end portion which extends lengthwise beyond the free end of the outer cable member, the inner cable member including a flexible working core and a length of wire tightly wrapped around the core in a helical configuration and with a given lengthwise pitch, whereby the inner cable member has an apparent diameter which is substantially equal to the sum of the diameter of the core and twice the diameter of the wire, the wire defining a helical groove, at least the projecting end portion of the inner cable member including a reinforcing member formed by a flexible polymeric material which fills the helical groove.

11 Claims, 2 Drawing Figures

FLEXIBLE COAXIAL PUSHPULL CABLE

This application is a continuation, of application Ser. No. 357,524, filed Mar. 12, 1982 now abandoned.

BACKGROUND OF THE INVENTION

The invention relates to a flexible coaxial pushpull cable having terminal tubular fitting, and more particularly, to the structure of a projecting end portion of an inner cable member axially extending through the terminal tubular fitting.

A flexible coaxial pushpull cable includes an inner and an outer coaxial cable member, and the end of the outer cable member is connected to a terminal tubular fitting while the inner cable member has a projecting end which axially extends through the fitting to carry a rod-shaped extension fitting serving as a load coupling. Two types of terminal tubular fittings are known including a bulkhead type and a bracket clamp type although their internal constructions remain substantially the same. The rod-shaped extension fitting includes a sleeve, one end of which is in swivel coupling with one end of the terminal tubular fitting. An example of a terminal tubular fitting including such universal pivot joint is disclosed in U.S. Pat. No. 4,238,974 issued to Harry E. Fawcett, Dec. 16, 1980. Generally, the swivel joint permits an angular movement through about 8° of the rod-shaped extension fitting together with a sleeve, in either direction. To assure such angular movement, an air gap is maintained between the inner cable member on one hand and the terminal tubular fitting and the sleeve on the other hand. In other words, the terminal tubular fitting and the sleeve has inner diameters which are substantially greater than the outer diameter of the inner cable member. The inner cable member comprises a single core or armored or non-armored multi-wrapped strand of stainless steel, which is flexible and exhibits a high resistance to either expansion or shrinkage. However, its bending strength is relatively low. Consequently, when the rod-shaped fitting is deflected angularly, the application of power or load to the inner cable member causes an undersirable bending deformation within the gap, or a transmission error.

SUMMARY OF THE INVENTION

It is an object of the invention to provide a flexible coaxial pushpull cable capable of reducing a power transmission error which might result from an undesirable bending deformation of an inner cable member in the region of a swivel joint between a terminal tubular fitting and a sleeve which carries a rod-shaped extension fitting.

It is a specific object of the invention to provide a flexible coaxial pushpull cable including an inner and an outer cable member in which the inner member is smoothly slidable with respect to the outer member and has a projecting end portion which axially extends beyond the free end of the outer member and which is flexible, but which is reinforced to provide a suitable degree of bending strength.

In accordance with the invention, there is provided a flexible coaxial pushpull cable comprising an outer cable member, and an inner cable member disposed inside the outer member so as to be slidable lengthwise therein, the inner cable member having a projecting end portion which extends lengthwise beyond the free end of the outer cable member, the inner cable member including a flexible working core and a length of wire tightly wrapped around the core in a helical configuration and with a given legthwise pitch, whereby the inner cable member has an apparent diameter which is substantially equal to the sum of the diameter of the core and twice the diameter of the wire. The wire defining a helical groove, at least the projecting end portion of the inner cable member including a reinforcing member formed by a flexible polymeric material which fills the helical groove.

In accordance with the invention, the flexible working core may comprise a single core of stainless steel or a wrapped multi-strand of stainless steel. Similarly, the wire may be formed of stainless steel and may have a circular cross section. The reinforcing member can be formed with a material selected from a group of flexible polymeric materials including polypropylene, vinyl chloride, polyethylene, nylon, synthetic rubber or the like.

DESCRIPTION OF PREFERRED EMBODIMENT

Figure 1:
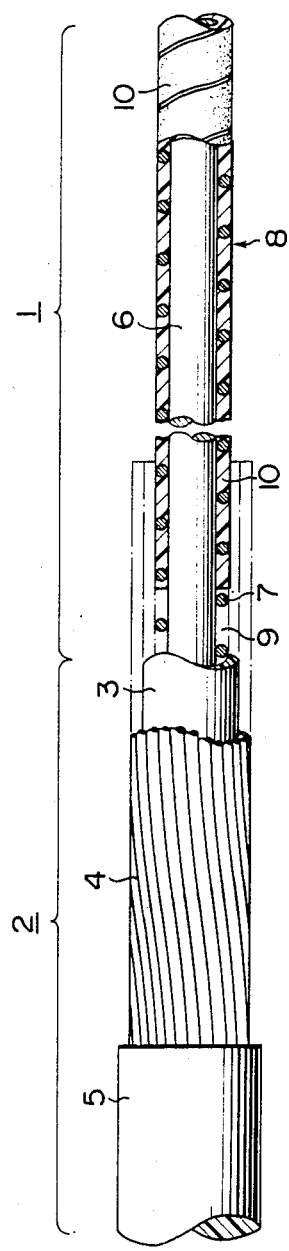
FIG. 1 is a side elevation, partly broken away, of a flexible coaxial pushpull cable of the invention.

Referring to FIG. 1, there is shown a flexible coaxial pushpull cable which is similar to a conventional one in many respects, but which includes a number of important differences over the prior art in accordance with the invention. The pushpull cable comprises a flexible inner cable generally designated by reference numeral 1, and a flexible outer cable member generally designated by numeral 2. The outer cable member 2 represents a multi-layer tubular member including a plastic liner 3 which defines an inner bearing surface, an outer steel strand 4 and an anti-abrasion plastic sheath 5. The inner cable member 1 is received inside the outer member and is lengthwise slidable therein. The inner cable member 1 comprises a flexible working core 6 formed by a single core of stainless steel or a wrapped multi-strand of stainless steel, and a length of stainless steel wire 7 tightly wrapped around the core 6 in a helical configuration and with a given lengthwise pitch. In a preferred embodiment, the surface of the wire 7 is swaged after it has been wrapped around the core 6. The inner cable member 1 includes an end portion 8 which projects lengthwise beyond the end of the outer cable member 2. The length of the projecting end portion 8 depends on the lengthwise sliding movement of the inner member 1 with respect to the outer member 2, but is usually chosen within a given range. The inner cable member 1 has an apparent diameter or a substantial diameter which is substantially equal to the sum of the diameter of the core 6 and twice the diameter of the wire 7. By wrapping the wire 7 around the core 6 in a helical configuration and with a given lengthwise pitch, there is formed a helical groove 9 around the core 6 which has a depth corresponding to the diameter of the wire 7.

In accordance with the invention, at least the projecting end portion 8 of the inner cable member 1, or a length slightly greater than such end portion, is reinforced by utilizing flexible polymeric material 10. The reinforcement takes place by filling the helical groove 9 around the core 6 with flexible polymeric material.

More specifically, a length of the inner cable member which defines the projecting end portion 8 is placed within a mold for purpose of injection molding. The molded reinforcement 10 improves the bending strength in the region of the projecting end portion 8 without detracting from the general flexibility of the inner cable member 1. The reinforcing resin layer 10 may have a thickness which is substantially equal to the depth of the helical groove 9. Preferred flexible polymeric materials used include polypropylene, vinyl chloride, polyethylene, nylon and synthetic rubber. On the other hand, in order to reduce the friction occurring between the inner and the outer cable member 1, 2, the inner cable member 1 carries a lubricant oil of a relatively low viscosity in the helical groove 9. It is to be understood that the lubricant oil is applied to the helical groove 9 in a region which is not filled with the reinforcement 10. The provision of the helical wire 7 around the core 6 is preferred in reducing the friction between the both cable members, as compared with the inner cable member of an armored strand cable, and is also advantageous in carrying the lubricant oil therein. From the standpoint of reducing the friction, it is desirable that the plastic liner 3 of the outer cable member 2 be formed of a material selected from a group comprising nylon, polyethylene, Teflon, polyacetal, and polybutadiene therephthalate. It is also found that the friction between the both cable members can be reduced by swaging the outer surface of the wire 7, after it has been helically wrapped around the core 6. This occurs as a result of a slight change occurring in the cross sectional configuration of the wire 7 which increases the area of contact, but which reduces the pressure of contact between the both cable members.

Figure 2:
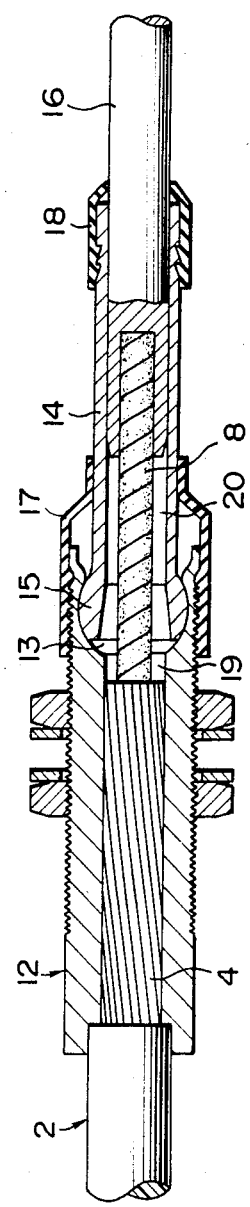
FIG. 2 is a longitudinal section of the flexible coaxial pushpull cable of the invention with a terminal fitting connected thereto.

Referring to FIG. 2, a terminal fitting of known form is attached to the flexible coaxial pushpull cable of the invention. The end of the outer cable member 2 is inserted into one end of a terminal tubular fitting 12 in known manner, and is firmly secured therein. The other end of the fitting 12 is formed with open-ended socket means 13, and one end of a sleeve 14 is provided with a ball member 15 which is disposed in swivel coupling with the socket means 13. The projecting end portion 8 of the inner cable member 1 which projects beyond the free end of the outer cable member 2 extends through the terminal tubular fitting 12 and is firmly connected to one end of a rod-shaped extension fitting 16 which engages the other end of the sleeve 14 in a lengthwise slidable manner. The other end of the fitting 16 extends lengthwise beyond the other end of the sleeve for connection with a load or drive source in known manner.

Seal caps 17, 18 of an elastic material are disposed across the terminal tubular fitting 12 and the sleeve 14 and across the fitting 16 and the sleeve 14. Together with the sleeve 14, the fitting 16 is angularly movable through 8°, for example, in either direction about the terminal tubular fitting 12. When the fitting 16 is angularly deflected, the projecting end portion 8 of the inner cable member 1 will flex in the region of the swivel joint. To assure such bending, the inner diameter of the other end of the terminal tubular fitting 12 and the inner diameter of the one end of the sleeve are greater than the outer diameter of the projecting end portion 8, producing air gaps 19, 20 therebetween. When the inner cable member 1 is loaded by a pushpull operation, a bending stress of an increased magnitude is applied to the inner cable member 1, which causes a power transmission error due to deformation with a conventional flexible coaxial pushpull cable. By contrast, with the flexible coaxial pushpull cable of the invention, the projecting end portion 8 is provided with the reinforcement 10 which comprises flexible polymeric material, so that such bending deformation is reduced. Such improvement is realized without increasing the apparent diameter of the the inner cable member 1. On the other hand, the resin reinforcement 10 formed around the projecting end portion 8 provides a smooth peripheral surface for the latter, thus assuring a smooth pushpull operation if the inner cable member 1 happens to contact the inner edge of the opening of the socket means 13 as a result of a bending deformation of the projecting end portion 8 resulting from the application of an impacting load upon the inner cable member 1 when the rod-shaped extension fitting 16 is angularly deflected. It is desirable that the thickness of the reinforcement resin layer 10 be slightly greater than the diameter of the wire 7 in order to improve the response of the inner cable member 1 with respect to the terminal tubular member 12.

What is claimed is:

1. A flexible coaxial pushpull cable adapted to be connected to a terminal tubular fitting, comprising an outer cable member, an inner cable member disposed inside said outer cable member so as to be slidable lengthwise therein, said inner cable member having a projecting end portion which extends lengthwise beyond one end of said outer cable member, said inner cable member including a flexible working core of substantially circular cross section and a length of metal wire wrapped around said core in a helical configuration to define a helical groove between the helical wraps of said wire, said helical groove having a depth substantially equal to the radial thickness of said wire, a resin reinforcement on said projecting end portion of said inner cable member, said resin reinforcement being a molded flexible polymeric material which is injection-molded into said helical groove and which fills said helical groove such that said molded flexible polymeric material has a thickness which is substantially equal to the depth of said helical groove, said resin reinforcement thereby reducing bending deformation of said projecting end portion, said projecting end portion being adapted to be received and to be bent in said terminal tubular fitting such that said flexible polymeric material provides a smooth peripheral surface on said projecting end portion to assure a smooth push-pull operation should said projecting end portion contact said terminal tubular fitting as a result of bending of said projecting end portion within said terminal tubular fitting.

2. A flexible coaxial pushpull cable according to claim 1, in which said wire is swaged after it has been helically wrapped around the core.

3. A flexible coaxial pushpull cable according to claim 1, wherein said flexible polymeric material is selected from the group consisting of polypropylene, vinyl chloride, polyethylene, nylon and synthetic rubber.

4. A flexible coaxial pushpull cable adapted to be connected to a terminal tubular fitting, comprising an outer cable member, and inner cable member disposed inside said outer cable member so as to be slidable lengthwise therein, said inner cable member having a projecting end portion which extends lengthwise beyond one end of said outer cable member, said inner cable member including a flexible working core of substantially circular cross section and a length of metal wire wrapped around said core in a helical configuration to define a helical groove between the helical wraps of said wire, said helical groove having a depth substantially equal to the radial thickness of said wire, a resin reinforcement on said projecting end portion of said inner cable member, said resin reinforcement being a molded flexible polymeric material which is injection-molded onto said projecting end portion to fill said helical groove and to extend radially outwardly of said helical groove such that said molded flexible polymeric material has a thickness which is greater than the depth of said helical groove, said resin reinforcement thereby reducing bending deformation of said projecting end portion, said projecting end portion being adapted to be received and to be bent in said terminal tubular fitting such that said flexible polymeric material provides a smooth peripheral surface on said projecting end portion to assure a smooth pushpull operation should said projecting end portion contact said terminal tubular fitting as a result of bending of said projecting end portion within said terminal tubular fitting.

5. A flexible coaxial pushpull cable according to claim 4, in which said wire is swaged after it has been helically wrapped around the core.

6. A flexible coaxial pushpull cable according to claim 4, wherein said flexible polymeric material is selected from the group consisting of polypropylene, vinyl chloride, polyethylene, nylon and synthetic rubber.

7. The combination comprising:
(a) a flexible coaxial pushpull cable comprising an outer cable member, an inner cable member disposed inside said outer cable member so as to be slidable lengthwise therein, said inner cable member having a projecting end portion which extends lengthwise beyond one end of said outer cable member, said inner cable member including a flexible working core of substantially circular cross section and a length of metal wire wrapped around said core in a helical configuration to define a helical groove between the helical wraps of said wire;
(b) a terminal tubular fitting means comprising a sleeve with an inner cylindrical opening which receives said projecting end portion of said inner cable member, said terminal tubular fitting means further comprising a tubular member disposed on said one end of said outer cable member and having a socket, said sleeve being provided with a ball member which is disposed in a swivel coupling relationship with said socket, a rod-shaped extension fitting slidable within said cylindrical opening in said sleeve, said rod-shaped extension fitting being connected to said projecting end portion of said inner cable member such that a push-pull action is transmitted between said rod-shaped extension fitting and said inner cable member as said rod-shaped extension fitting slides axially in said cylindrical opening in said sleeve, said sleeve being angularly movable relative to said outer cable member as said ball swivels in said socket and said projecting end portion of said inner cable bends in the region of said swivel coupling, said inner cylindrical opening in said sleeve having a diameter greater than the outer diameter of said projecting end portion of said inner cable member to provide space for said projecting end portion of said inner cable to bend; and
(c) a resin reinforcement of said projecting end portion of said inner cable member, said resin reinforcement being a molded flexible polymeric material which is injection molded into said helical groove and which fills said helical groove such that said molded flexible polymeric material has a thickness which is substantially equal to the depth of said helical groove, said resin reinforcement thereby reducing bending deformation of said projecting end portion while providing a smooth peripheral surface on said projecting end portion to assure a smooth push-pull operation should said projecting end portion contact said sleeve as a result of bending of said projecting end portion.

8. The combination comprising:
(a) a flexible coaxial pushpull cable comprising an outer cable member, an inner cable member disposed inside said outer cable member so as to be slidable lengthwise therein, said inner cable member having a projecting end portion which extends lengthwise beyond one end of said outer cable member, said inner cable member including a flexible working core of substantially circular cross section and a length of metal wire wrapped around said core in a helical configuration to define a helical groove between the helical wraps of said wire;
(b) a terminal tubular fitting means comprising a sleeve with an inner cylindrical opening which receives said projecting end portion of said inner cable member, said terminal tubular fitting means further comprising a tubular member disposed on said one end of said outer cable member and having a socket, said sleeve being provided with a ball member which is disposed in a swivel coupling relationship with said socket, a rod-shaped extension fitting slidable within said cylindrical opening in said sleeve, said rod-shaped extension fitting being connected to said projecting end portion of said inner cable member such that a push-pull action is transmitted between said rod-shaped extension fitting and said inner cable member as said rod-shaped extension fitting slides axially in said cylindrical opening in said sleeve, said sleeve being angularly movable relative to said outer cable member as said ball swivels in said socket and said projecting end portion of said inner cable bends in the region of said swivel coupling, said inner cylindrical opening in said sleeve having a diameter greater than the outer diameter of said projecting end portion of said inner cable member to provide space for said projecting end portion of said inner cable to bend; and
(c) a resin reinforcement on said projecting end portion of said inner cable member, said resin reinforcement being a molded flexible polymeric material which is injection-molded onto said projecting end portion to fill said helical groove and to extend radially outwardly of said helical groove such that said molded flexible polymeric material has a thickness which is greater than the depth of said helical groove, said resin reinforcement thereby reducing bending deformation of said projecting end portion while providing a smooth peripheral surface on said projecting end portion to assure a smooth push-pull operation should said projecting end portion contact said sleeve as a result of bending of said projecting end portion.

9. A flexible coaxial pushpull cable according to claim 8, wherein said polymeric material has a generally overall circular cross-section configuration with an apparent diameter less than the diameter of said cylindrical opening in said sleeve.

10. A flexible coaxial pushpull cable according to claim 7, wherein said tubular member has an internal cylindrical portion having a diameter greater than the diameter of said projecting end portion, said internal cylindrical portion being disposed at said one end of said outer cable member and providing space in which said projecting end portion can be bent.

11. A flexible coaxial pushpull cable according to claim 8, wherein said tubular member has an internal cylindrical portion having a diameter greater than the diameter of said projecting end portion, said internal cylindrical portion being disposed at said one end of said outer cable member and providing space in which said projecting end portion can be bent.

* * * * *